(12) United States Patent
Hohman

(10) Patent No.: US 12,213,025 B2
(45) Date of Patent: Jan. 28, 2025

(54) SYSTEMS AND METHODS FOR REAL-WORLD NETWORKING USING AUGMENTED REALITY INTERFACE

(71) Applicant: Charles Hohman, Upland, CA (US)

(72) Inventor: Charles Hohman, Upland, CA (US)

( * ) Notice: Subject to any disclaimer, the term of this patent is extended or adjusted under 35 U.S.C. 154(b) by 434 days.

(21) Appl. No.: 17/747,892

(22) Filed: May 18, 2022

(65) Prior Publication Data

US 2022/0279317 A1    Sep. 1, 2022

Related U.S. Application Data

(63) Continuation-in-part of application No. 17/397,754, filed on Aug. 9, 2021, now abandoned, which is a continuation of application No. 16/787,338, filed on Feb. 11, 2020, now Pat. No. 11,089,439.

(60) Provisional application No. 63/267,710, filed on Feb. 8, 2022, provisional application No. 62/936,198, filed on Nov. 15, 2019, provisional application No. 62/869,989, filed on Jul. 2, 2019.

(51) Int. Cl.
*H04W 24/00* (2009.01)
*G06T 11/00* (2006.01)
*H04W 4/02* (2018.01)
*H04W 4/029* (2018.01)

(52) U.S. Cl.
CPC ........... *H04W 4/029* (2018.02); *G06T 11/001* (2013.01); *H04W 4/023* (2013.01); *G06T 2200/24* (2013.01)

(58) Field of Classification Search
CPC .... G06T 19/006; H04W 4/023; H04W 4/029; H04W 64/00
See application file for complete search history.

(56) References Cited

U.S. PATENT DOCUMENTS

| | | | |
|---|---|---|---|
| 8,814,691 B2 | 8/2014 | Haddick et al. | |
| 9,498,694 B2 | 11/2016 | Huston et al. | |
| 9,775,015 B1* | 9/2017 | Mishra | G06F 3/0488 |
| 10,032,233 B2 | 7/2018 | Papakipos et al. | |
| 10,242,502 B2 | 3/2019 | Dange | |
| 10,262,039 B1 | 4/2019 | Ramanathan et al. | |
| 10,264,102 B2 | 4/2019 | Nahumi et al. | |
| 2005/0181803 A1 | 8/2005 | Weaver et al. | |
| 2008/0140650 A1* | 6/2008 | Stackpole | H04W 4/02 707/999.005 |
| 2011/0071757 A1 | 3/2011 | Lee et al. | |
| 2012/0271883 A1* | 10/2012 | Montoya | H04L 51/222 709/204 |

(Continued)

*Primary Examiner* — Shantell L Heiber
(74) *Attorney, Agent, or Firm* — Umberg Zipser LLP; Ryan Dean

(57) ABSTRACT

Systems and methods for networking or interacting with users of a network are described that utilize elements presented on a user device. Each element preferably presents information about a user associated with the element and can be a link to additional information about that user. The elements can be presented on or using the user device based on information received from a server, which can analyze a location of the user relative to other users in a real or virtual world and compare information about the users to determine a likelihood that each pair of users may be a match. The analysis can be based on characteristics of the users as well as user input such as preferences and so forth. The potential matches can be presented to the user.

17 Claims, 13 Drawing Sheets

(56) References Cited

U.S. PATENT DOCUMENTS

| | | |
|---|---|---|
| 2013/0005437 A1 | 1/2013 | Bethke et al. |
| 2013/0050258 A1 | 2/2013 | Liu et al. |
| 2013/0294594 A1* | 11/2013 | Chervets ................. H04M 3/56 |
| | | 379/202.01 |
| 2014/0108529 A1 | 4/2014 | Papakipos et al. |
| 2014/0108530 A1 | 4/2014 | Papakipos et al. |
| 2014/0280278 A1 | 9/2014 | Harris et al. |
| 2017/0123069 A1 | 5/2017 | Kotab |
| 2017/0169189 A1 | 6/2017 | Belz et al. |
| 2018/0181844 A1 | 6/2018 | Barnett et al. |
| 2018/0300822 A1 | 10/2018 | Papakipos et al. |
| 2018/0300916 A1 | 10/2018 | Barnett et al. |
| 2018/0350144 A1* | 12/2018 | Rathod .............. G06Q 20/3224 |
| 2019/0156575 A1 | 5/2019 | Korhonen |
| 2019/0182637 A1 | 6/2019 | France et al. |
| 2019/0220933 A1* | 7/2019 | Papakipos .............. G06Q 50/01 |
| 2020/0143238 A1 | 5/2020 | Ramnath et al. |
| 2020/0160054 A1* | 5/2020 | Rogan ................... H04W 4/023 |

* cited by examiner

SYSTEMS AND METHODS FOR REAL-WORLD NETWORKING USING AUGMENTED REALITY INTERFACE

This application is a continuation-in-part application of U.S. non-provisional application having Ser. No. 17/397,754 filed on Aug. 9, 2021, which itself is a continuing application of U.S. non-provisional application having Ser. No. 16/787,338 filed on Feb. 11, 2020 (now U.S. Pat. No. 11,089,439), which itself claims priority to U.S. provisional application having Ser. No. 62/869,989 filed on Jul. 2, 2019 and U.S. provisional application having Ser. No. 62/936,198 filed on Nov. 15, 2019. This application also claims priority to U.S. provisional application having Ser. No. 63/267,710 filed on Feb. 8, 2022. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is augmented and virtual reality applications.

BACKGROUND

The following description includes information that may be useful in understanding the present invention. It is not an admission that any of the information provided herein is prior art or relevant to the presently claimed invention, or that any publication specifically or implicitly referenced is prior art.

Augmented reality applications provide limitless options for overlays in real-world environments. One of the biggest areas in growth of augmented reality has been in the gaming industry, where users can use their mobile smart phones to play a game while interacting with a real-world environment. However, augmented reality has the ability to upset how people interact with their environment, whether in gaming, work, or other aspects.

Virtual reality applications allow users to interact in a virtual world or environment that may be related or unrelated to their real-world environment. Typically, users can explore the virtual world without requiring interaction with a real-world environment. Virtual world environments include, for example, the metaverse but could alternatively be a single virtual world rather than interconnected virtual worlds.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods that utilize augmented or virtual reality to facilitate networking or other social connection or interactions.

SUMMARY OF THE INVENTION

The inventive subject matter provides apparatus, systems, and methods for facilitating networking using an augmented-reality overlay or similar overlay in a virtual world environment. As used herein, the term "augmented reality" refers to the software technology used to create computer-generated overlays for a real-world environment. For example, this may be done by presenting an overlay on a computing device, which could be overlaid on a real-world view such as captured by a camera of a smart phone or a virtual world view created and/or presented by the computing device, depending on the application. The overlay may contain one or more computer-generated augmented reality (AR) elements that preferably relate to a user or a portion of the environment where the user is located or within a predefined geographic area of the user, for example. For virtual reality environments, the overlay may contain similar elements that may be overlaid over a portion of the virtual environment and preferably relate to another user or an object near the user.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
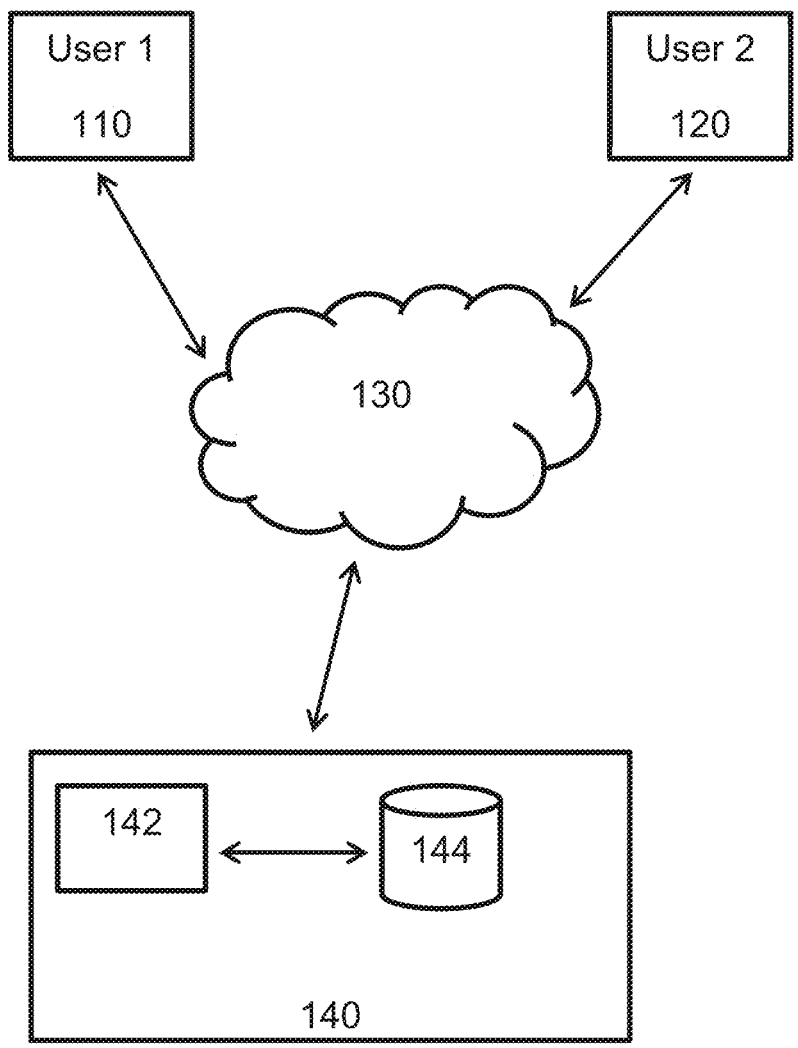
FIG. 1 illustrates one embodiment of a system for providing a social network application that utilizes overlays to facilitate networking among users of the application.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Contemplated systems and methods described herein provide for a social network application that utilizes augmented reality overlays presented on user devices to facilitate networking among users of the network. Such networking can include, for example, social interactions for those looking for dating, friendship, and/or business opportunities.

Embodiments of the inventions described herein may include or utilize a special purpose or general-purpose computer that includes one or more servers and/or other computer hardware. The one or more servers can each include, for example, one or more processors and system memory. The computer can also include physical and other computer-readable media for carrying or storing computer-executable instructions and/or data structures. Such instructions can facilitate the systems and methods described and may be stored in a non-transitory computer-readable medium and executable by the one or more servers or other computing devices. As an example, a processor may receive instructions from a non-transitory computer-readable medium and execute those instructions to perform one or more processes.

Computer-readable media can be any available media that can be accessed by a general purpose or special purpose computer system. Examples of computer-readable media include RAM, ROM, EEPROM, solid state drives, Flash memory, and other optical disk storage, magnetic disk storage or other magnetic storage devices, or any other medium which can be used to store desired application code in the form of computer-executable instructions or data structures, and which can be accessed by a general purpose or special purpose computer.

Computer-executable instructions include, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

The systems and methods described herein may utilize various communication protocols including, for example, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

As shown in FIG. 1, one contemplated system 100 comprise one or more servers 140 that are preferably accessible via the Internet 130 such as via a wireless or wired network. In some embodiments, computer-executable instructions or data structures 142 received over the wireless or wired network can be buffered in RAM within a network interface module and transferred to computer system RAM or other memory 144.

In preferred embodiments, users 110, 120, 122 access the social network server 140 via a software application loaded on each user's computing device (user device), or via a browser that access a web-based application via the user's computing device, either of which connects the user device with the one or more servers.

As used herein, the term "computing device" (also referred to as "user device") is defined to include laptop computers, tablet PCs, smart phones including, for example, those running APPLE iOS™ or ANDROID™ operating software, wearable devices such as smart watches and smart glasses such as GOOGLE™ glass or their equivalent capable of displaying augmented reality elements to a user wearing the glasses, rings or other accessories having circuitry to effect one or more functions, video game consoles, computers with one or more projectors, televisions, and all other devices that can connect to a network (or to another devices such as via a Bluetooth or other short- or mid-range connection) and receive and/or transmit information from or to a server or another device. In some embodiments, user devices may be capable of obtaining and providing location information of the user device whether through GPS, IP address, triangulation, or other commercially suitable methods. Preferred computing devices are those that allow a user to be immersed in an environment.

It is contemplated that some or all of the user devices may comprise a camera to allow the user device to capture an image or video of a surrounding environment, such as an event the user may be attending.

Figure 2:
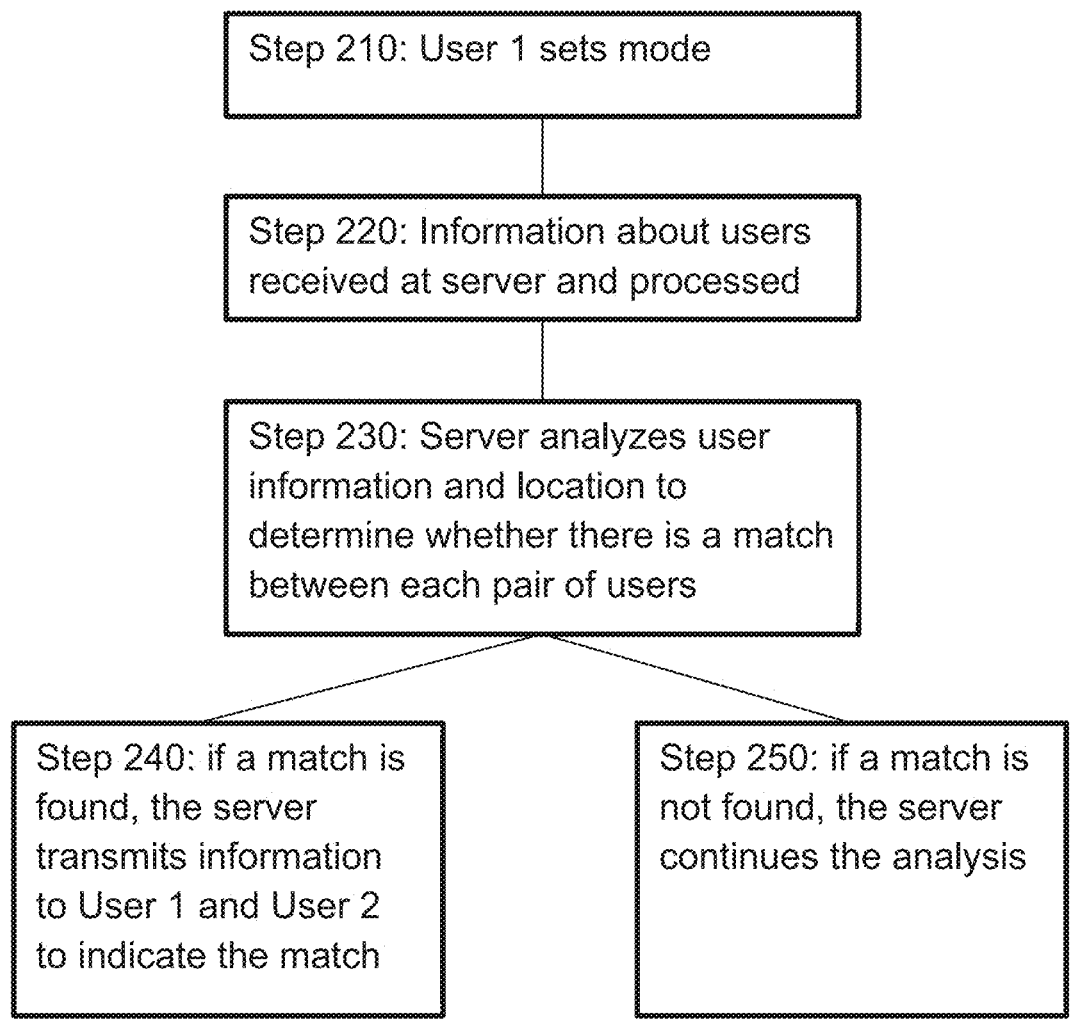
FIG. 2 illustrates one embodiment of a method for identifying matches of a user.

FIG. 2 presents one embodiment of a method of generating a set of potential matches for a user. In step 210, a first user sets a preferred mode for interaction, which could include, for example, open to dating, looking for friends and/or business networking. In step 220, information about users can be received and processed at a server. Preferably, the information may include a distance of the users from the first user. Ideally, the server will provide a set of matches for the first user that are within a predetermined distance from the user in the real or virtual world, depending on the application.

In step 230, the server analyzes the received information and location of the users to determine whether there is a match between the first user and the other users. If a match is found, the server transmits information to the users of the match in step 240. If a match is not found, the server will continue its analysis in step 250.

Figure 3:
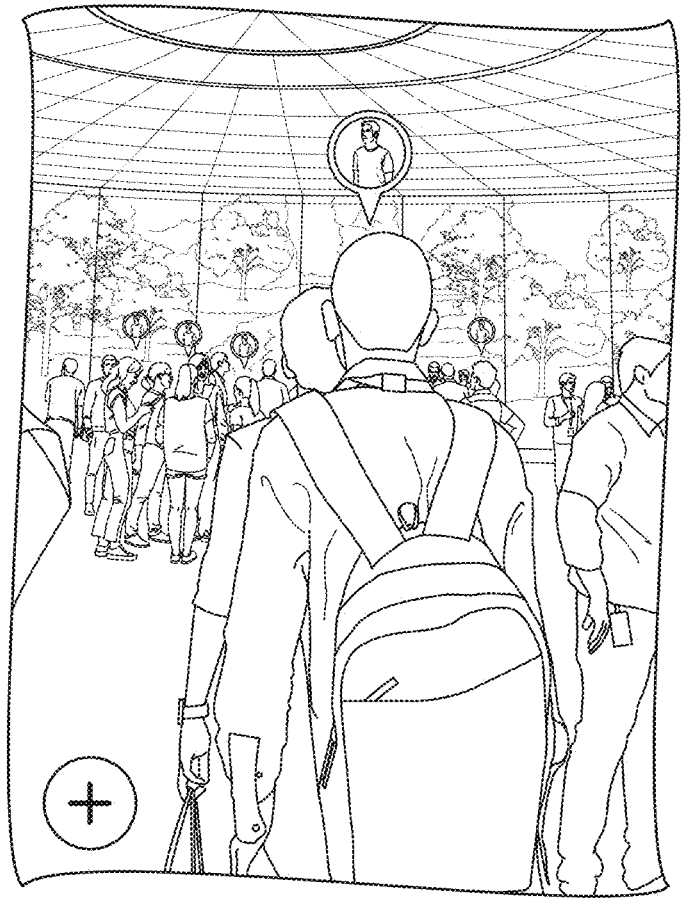
FIG. 3 illustrates one embodiment of an interface having an element disposed over a user in a real-world or virtual environment.

In FIG. 3, a user can view a real world or virtual environment using the user device. For real-world environments, it is contemplated that a user could view a real-world environment on a display screen of the device which captures and presents the view to the user. Such device may be a smart phone or a wearable device, for example. The captured image or video, or information therefrom, from the user device's camera, for example, is transmitted to the one or more servers such as via a wireless network. The transferred information could also include information about the user, information about the user device, a location of the user, a time of day, and so forth.

For virtual environments, information about a location of the first user in the virtual world and information about other users near the first user can be processed at a server, which may or may not be the server(s) that hosts the virtual world. Additional information about the first user, the other users, information about the user device, a location of the user, a time of day, and so forth may also be analyzed. Various discussions of virtual worlds including the metaverse are described in U.S. Pat. Nos. 10,326,667 and 8,019,797.

Information about each user could include, for example, characteristics of the user (e.g., age, gender, etc.), a status of the user (e.g., open to dating, friendship and/or business networking), and so forth.

Figure 7:
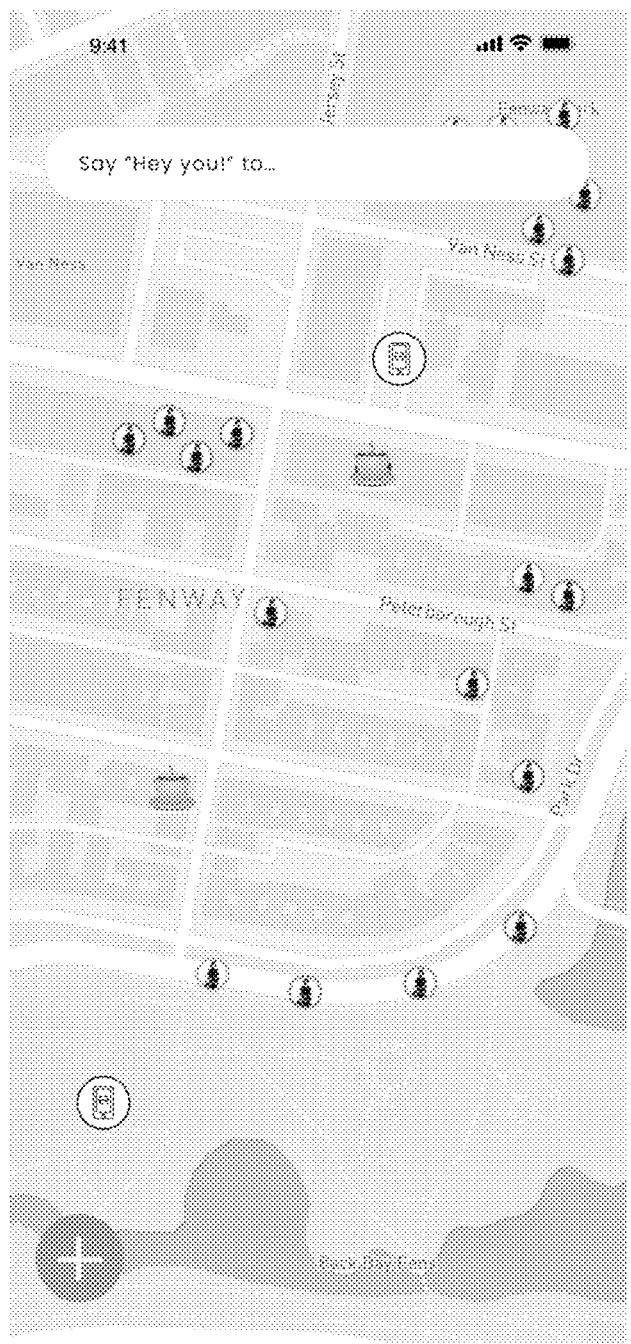
FIG. 7 illustrates one embodiment of a user interface showing a map with the location of various users of a social network and businesses.

Information relevant to a view or location of the first user in the real world or virtual environment can be overlaid on the image, video or map presented to the user using an augmented reality interface or overlaying one or more elements in the virtual environment as presented to the user. For example, one an interface could identify people, places and/or things (i.e., objects) in the environment, and can overlay one or more elements near the identified objects and thereby present information about those objects to the user that may be relevant or useful. An exemplary interface is shown in FIG. 7 where nearby business and users are shown.

As shown in FIG. 3, the interface can include one or more elements overlaid on a real-world image or video of an environment or presented in the virtual world environment, with each of the elements associated with a user/person or other object in the real world or presented in the virtual world environment. For elements associated with another user, each the element preferably comprises a ring or other border or indicator that identifies one or more of that user's status (e.g., open to dating, friendship and/or business networking), and a likelihood of match with the first user, for example. This could be done by having differently colored rings, each color representing a status of that user. However, it is also contemplated that different shapes, icons or other indicia could be used to designate a status of that user. In addition to the above, it is contemplated that a brightness or intensity of the ring or other indicator may be used to show a likelihood of a match with the first user, such as by greater likelihood matches having a more intense or brightness indicator.

Information about that user can be presented inside of the border in this example, and such information could include a profile or other picture of that user and a first name of the user, for example. It is contemplated that the element itself can act as a link to provide additional information about that user when selected. In one example, the element could provide a hyperlink to the user's social media profile, which could be accessed by clicking on or otherwise selecting the bubble about that user's head in this example.

As briefly described above, in some embodiments such as described in more detail below, one or more matching algorithms stored on the server could change a brightness or intensity of a user's ring, the shape, a glow, the color or other indicator to indicate a higher compatibility with the first user and therefore greater likelihood of being a match.

Figure 4:
FIG. 4 illustrates one embodiment of an interface showing a map with the location of various users of the social network, for example.

FIG. 4 illustrates another embodiment of an interface presented on a user device or otherwise to the first user that shows a map near the user's location in the real world or virtual environment overlaid with locations of other users at or near the user's location that meet predetermined criteria. Such criteria could be that the other users are within a specific distance of the user, have a certain status set, have characteristics such as age or gender that match the user's preferences, and so forth.

It is contemplated that the overlaid elements representing matches with other users can include a status of each user, where the statuses are shown in differently colored rings or borders that surround the user's picture or icon. It is contemplated in such interface; the user could filter the results using the user device or other input to show only those users reporting a specific status and/or that are less than a certain distance from the user. The results could be further filtered by user characteristics such as gender, age, and other characteristics.

It is also contemplated that the users/people presented on the user device or otherwise to the user could be a set of users pre-filtered by the one or more servers. For example, in some embodiments, the one or more servers can receive a location of the user and/or information about the environment where the user is located. For real-world environments, it is contemplated that at least some of the information is captured using a camera of the user device. The one or more servers can analyze the received information to generate a first set of potential matches based on the location of the user in the real or virtual world. Each match of the first set can be compared to information about the user using the one or more servers to generate a second set of potential matches that is a subset of the first set. Information about each match of the second set can be obtained, and a set of elements along with a view of the environment can be presented on the user device or otherwise, where each of the elements is associated with another user that is preferably nearby or viewable to the user.

Preferably, the results shown are periodically updated to account for changes in the locations of the users, changes in status, addition or removal of some users, and other changes that will likely occur over time.

Preferably, each of the elements contains at least some of the match information corresponding to that person/user, and each element, when actuated, causes a window to be overlaid on the view that comprises the match information or other information about that person/user.

In addition to filtering results presented to the first user, it is also contemplated that the first user could limit the results in which the first user appears based on one or more characteristics of the user conducting the search or one or more characteristics of other users. Thus, for example, if user A could set a preference to only appear to those users who are within a specific age range and are male. If user B does not meet those criteria, user A would not appear within the results for user B regardless of how close user A is to user B.

Figure 5:
FIG. 5 illustrates one embodiment of a user interface showing a map with the location of various users in a real-world or virtual environment and a profile of a user.

As discussed briefly above, each of the elements could be linked to a profile associated with that user, or a third-party website/social media platform, an email address, or a social media handle, which may provide additional information about that user. In this manner, a user can view the elements on the user device to look for potential matches, and then quickly find additional information about one or more of the potential matches by simply clicking on the element or otherwise selecting or interacting with the element such as via voice command. This advantageously permits a user to quickly see who matches the user's criteria and the user can learn more information about the matches before approaching one or more of the users in the real or virtual world. As an example, FIG. 5 illustrates an interface showing information about the selected user. Such information could be gathered from publicly available information, social media accounts, or be created by the specific user such as in a user profile set up by that user.

Figure 6:
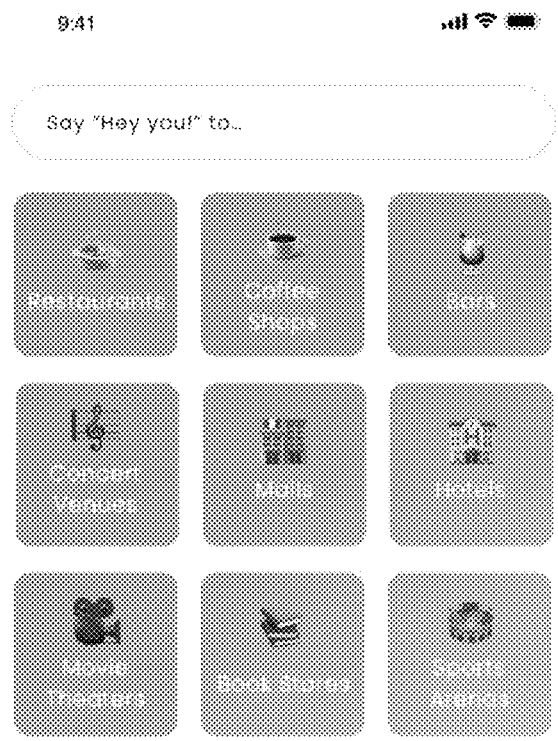
FIG. 6 illustrates one embodiment of a user interface showing categories of businesses.

FIG. 6 illustrates an exemplary embodiment of an interface of the social network that permits a user to find other users by location or category of location. Thus, for example, a user could click a predefined category of locations such as "Coffee Shops" or conduct a search. After making a selection, the user can be presented with another interface shown in FIG. 7 that identifies the location(s) of businesses of that category near the user (here, coffee shops) in the real or virtual world, as well as the location of nearby users. Using the interface, a user could invite another user to a coffee shop or other business, for example, by clicking the user's icon and then messaging them through the software application or other interface. It is contemplated that the interface could present sponsored businesses to the user to select when suggesting meeting with one or more other users. In such embodiments, it is contemplated that a coupon or other promotion could be presented to the user to incentivize selecting one business or location over another in the real or virtual world.

It is further contemplated that a user may select a business or other location and could then review information about a number of users at that location, a number of users expected at that location based on historical data of past visits, or information about the users at or nearby the location, where the location is in the real or virtual world.

Figure 8:
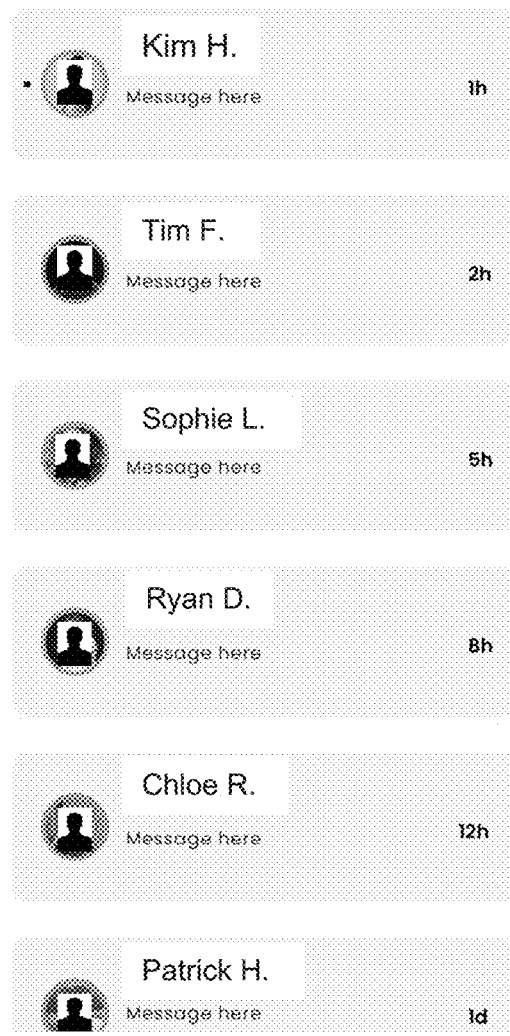
FIG. 8 illustrates one embodiment of an interface showing a chat window.

FIG. 8 illustrates an exemplary embodiment of interface for chatting with other users of the social network. Using this interface, users can message one another and/or suggest meeting at a specific location in the real or virtual world. The interface may list other users with whom the user has interacted in the past, or a list of nearby users. It is contemplated that the user could sort the list based on one or more criteria such as prior interactions, distance from the user in the real or virtual world, likelihood of a match, and/or status.

In one aspect, the system can provide an emergency mode where a user can indicate an emergency. Once indicated, a message can be sent to preset contacts of the user with a real-world location and/or other information so the contacts can assist the user. Audio and/or video could also be recorded and transmitted to the other users and stored onto a remote location for later retrieval. In such situations, the user's location could be turned off to other users, or at least those users not predefined, to prevent someone from following the user, for example.

Figure 9:
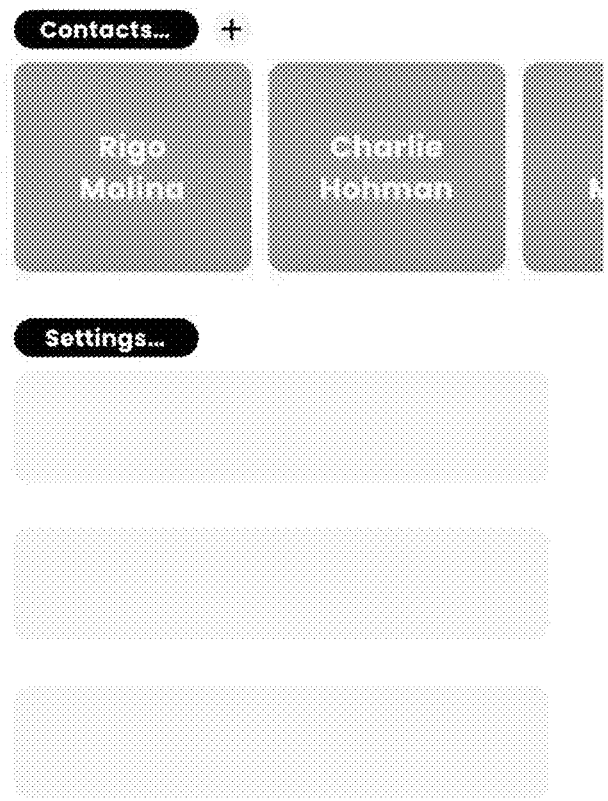
FIG. 9 illustrates one embodiment of an interface showing a setup screen to add emergency contacts.

FIG. 9 illustrates an exemplary interface where a user can identify emergency contacts and vary security settings of the interface. This could include who to contact in an emergency and what information to transmit to those emergency contacts.

Figure 10:
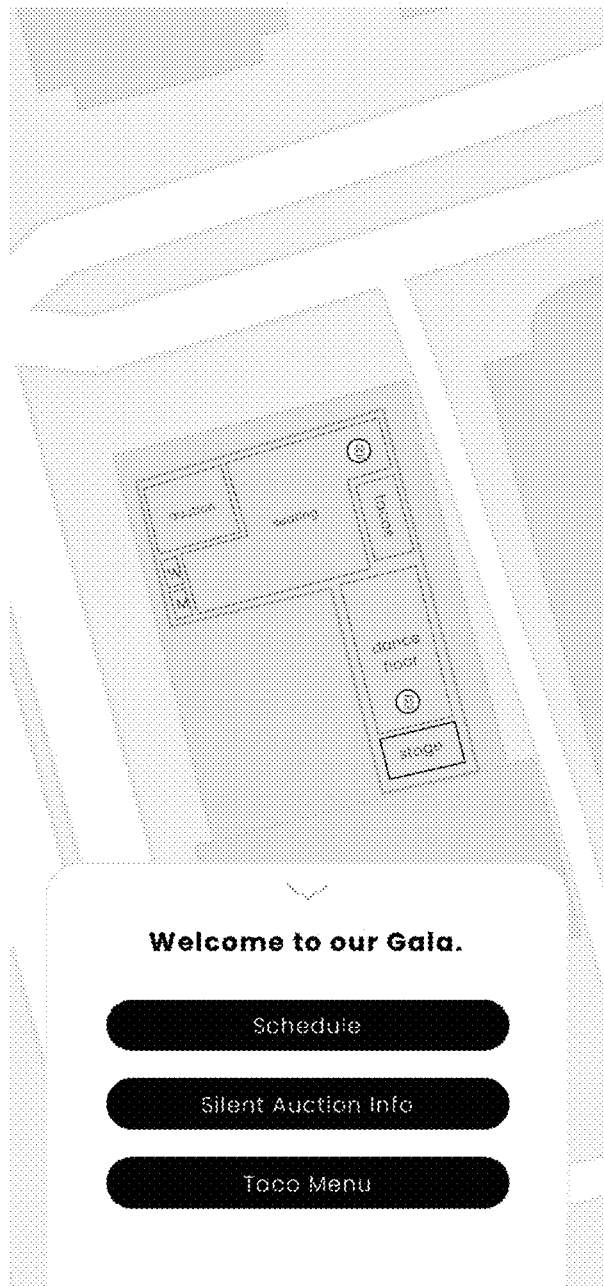
FIG. 10 illustrates one embodiment of an interface showing a location map of an event.

In another embodiment, an event host can utilize the systems and methods described herein to create a geofence of an area or business in the real or virtual world where users may interact with one another. FIG. 10 illustrates one example of an interface where a geofence surrounds an auction area, a seating area, a dining area (tacos), a dance floor and a stage.

In such embodiments, it is contemplated that user movement could be tracked within the geofenced area in the real or virtual world, so an event host can understand the flow of users over time and where and how long they remained in a specific area. This could be used to see how long people stayed in a specific area (i.e., the dance floor) or at what points users decided to move (such as when a different band began to play).

To avoid privacy concerns, especially in regions having more stringent requirements, it is contemplated that the user information could be grouped by category or otherwise aggregated so that individual user privacy is maintained. Where an event is hosted using the system, it is contemplated that a custom mode or "status" could be used to indicate the user is there for the event.

Event hosts may also be able to access information concerning the connections made or existing between various users at the event. For example, the system could provide the number of connections made, the number of missed connections and so forth.

A user of the network could view the event layout such as by using the interface shown in FIG. 10 and can see overlaid elements representing one or more users present at the event. As discussed above, these elements can have different colors, shapes, or other indicators to help the user identify best matches according to the user's profile and interests.

It is contemplated that in addition to showing users near the user, the system could gather information about people at an event or located near the user in the real or virtual world such as via the user device. For example, for augmented reality applications, the user device can capture an image or video of a real world surrounding, which can include one or more people. The captured information, or information derived therefrom such as by preprocessing the captured information on the user device, can be transmitted to a server of the social network or other server. The transmitted information can then be analyzed via existing image recognition techniques to identify faces in the captured image or video, or information therefrom. The server or servers can then compare the faces and/or information derived from the faces (such as facial characteristics) with a database of information to identify one or more of the faces in the captured image or video. If a face is identified with a certainty that is above a predefined threshold, the server can obtain information about the identified user and transmit that information to the user device. Once received, an element can be overlaid and presented over that user on the display of the user device.

For virtual world environments, it is contemplated that the one or more servers will know the users located in a specific area of the virtual world and may provide that to the user depending on privacy settings of the one or more users. However, for an application that is being used in a virtual world hosted by another party, the ability to recognize avatars can be equally useful.

In this manner, it is contemplated that unknown people at an event or a specific location in the real or virtual world can be identified using identifying facial characteristics and publicly available information which could be gathered through search engines or social media platforms, for example. Based on the information obtained about the user, the server can compare the information with information about the user to assign a match probability. The server can alert the user device if the match probability is greater than a predefined threshold.

In some embodiments, the system can cause the user's device to vibrate or otherwise indicate when a match is nearby. It is contemplated that the specific vibration or indication (such as length of the vibration, a strength of the vibration, and/or a number of vibrations) can be tailored to the type of match, match probability, and/or how close/relevant the match is to the user. For example, where a user is wearing a smart watch, it is contemplated that the watch could vibrate to indicate a match is nearby. The user can then look at the watch for directions, information about the match, or other information to facilitate connection between the user and the match. In some embodiments, the vibration can strengthen (e.g., increase in frequency or strength of the vibration) as the user gets closer to a potential match, and weaken as the user moves away. In other embodiments, it is contemplated that the strength of the vibration can vary depending on the likelihood that another user is a match with the user, with greater likelihoods associated with stronger or more frequent vibrations, for example.

This could avoid the user having to check the user device for directions and instead the user can guide him or herself to the potential match. In such embodiments, it is contemplated that the other of the user (the match) may have a similar vibration such that each of the two users is guided toward the other of the users.

In another embodiment, it is contemplated that one or both users who are a potential match could be connected in a chat function or presented with one or more proposed locations to meet. Such locations could be at the event or other locations and may be based on promoted locations or nearby locations. For promoted locations, it is contemplated that the location could be suggested concurrently with a coupon or other special to entice them to meet at that location. This all could be done with an overlay, for example.

In other embodiments, the user could refuse the match such that the application will no longer indicate a match with that user.

In some embodiments, when a user is utilizing the augmented reality overlay, one or more specials or advertisements may be presented on the interface on the user device. For example, an advertisement for a neighboring bar could appear that could include specials (e.g., happy hour), a coupon (e.g., $1 off drinks or food), or information about the number or type of users at the bar (e.g., five potential matches). When a match is found, the system may automatically suggest to both users that they meet and present suggested locations. In such embodiments, it is contempered that sponsored locations could be presented that may have a special (e.g., happy hour) or coupon ($1 off well drinks).

In some embodiments, to help ensure confidence that users are who they appear to be in their profile, it is contemplated that users could be self-verified or automatically verified by the system. Self-verification could require submission of identifying information or links to work, school, or social media profiles. Automatic verification could occur by reviewing publicly available information about a user, such as search engine search results, social media accounts, and other websites. The information can be gathered and analyzed to determine if there is overlap. For example, if a user's name is the same across the platforms, it is more likely that the name is that of the user when compared to a user who uses different names across different platforms. A user could also be searched by name or other identifying information and/or by using image recognition of a submitted or tagged picture of the user.

It is contemplated that users could report interactions with other users that violate set out terms of service of the platform. In one example, the system could collect reports from multiple users about a specific user and then take action if predetermined criteria are met. The type of action taken and the criteria will depend on the specific violation of the terms.

For example, if a user uses a profile picture that is not of the user, and a specific number of users report the offending user, the user could be flagged and required to submit an updated picture. Once the updated picture is submitted, the picture could be compared with known images of that user, such as from a public database.

If a user has a more alarming violation such as potential stalking or other behavior, it is contemplated that the system could collect reports of the user from different users, and then utilize the information to connect the users reporting the violation and/or prepare a police report that could be filed if desired.

In some embodiments, users' interests can be collecting from surveying/mining social media accounts for a user. In addition, past locations of a user and the user's modes could be collected to determine what advertising should be shown to that user. Because the advertising is placed using augmented reality elements, the specific advertising presented can be unique to that user based on the user's information including, for example, the user's location.

It is contemplated that the system can dynamically determine the buffering radius to use when presenting the augmented reality elements in the user interface based on the number of users within a geographical area. For example, in an empty bar, the server may provide information to create augmented reality elements within a thirty feet radius of the user's location. However, in a crowded setting when there is a higher density of users per square foot, the server may provide information to create augmented reality elements within a three feet radius of the user's location. This is done to ensure proper A/R rendering with limited lag, and to conserve bandwidth when many users are engaging the server in a small area. Of course, as computing speeds and bandwidth increase, the specific settings can be varied to ensure the best experience of users.

It is further contemplated that the server could limit a number of requests by users overall and by specific users to a specified number per minute to avoid overloading the server. In some embodiments, the number of requests could be limited to 100,000 per minute, but the specific number will depend on server architecture and other factors.

It is also contemplated that the system could utilize round robin architecture for timing and to space out requests of the server.

It is contemplated that the system could request, or the user's device could transmit, the device's location and optionally position/orientation information to the server when the application is initially opened. This can help the server identify not only the location of the user device but what direction the user device is facing, such as to gather information about only the people in the viewing range of the user device, for example. In other embodiments, the location of the user device can be used to identify which users are nearby the user device, and the user device's location can then be recorded, and the location can be transmitted to other users during periodic requests for updated information within a specific geographical range of each user.

Once the updated information is received, the elements and/or users' placemarks can be moved, changed, deleted, or added to update according the information gathered by the user device.

In some embodiments, the user device can be configured transmit updated location information to the server if a gyroscope or other sensor detects movement of the user device. In such embodiments, if no movement is detected, then the device will not transmit updated location information. Alternatively, or additionally, it is contemplated that the user device could send updated information to the server on a periodic basis that could include location information. This could be used to confirm no movement of a user, such as when a user is sitting at a table, for example.

It is further contemplated that users can block other users if desired, and those blocked users will no longer see their location or information through the application. Each user will receive information concerning whether a blocked user is nearby, which may be presented in the form of an alert to the user to avoid a specific area or user. If enough users block a specific user, the blocked user could have their account terminated, depending on the number of people blocking the user during a specific timeframe, for example.

Figure 11:
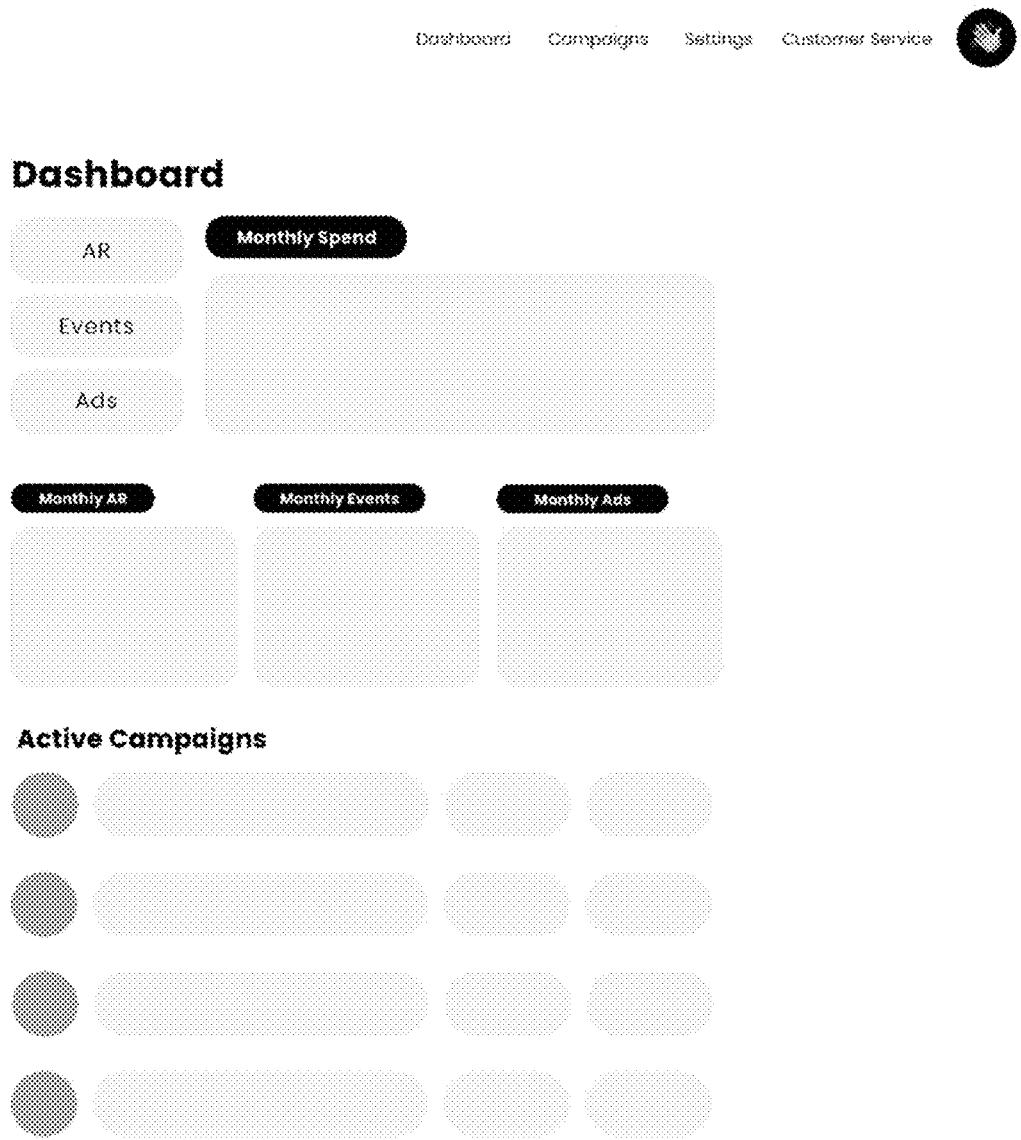
FIG. 11 illustrates one embodiment of an interface showing a dashboard for managing advertising campaigns on a social network.
Figure 12:
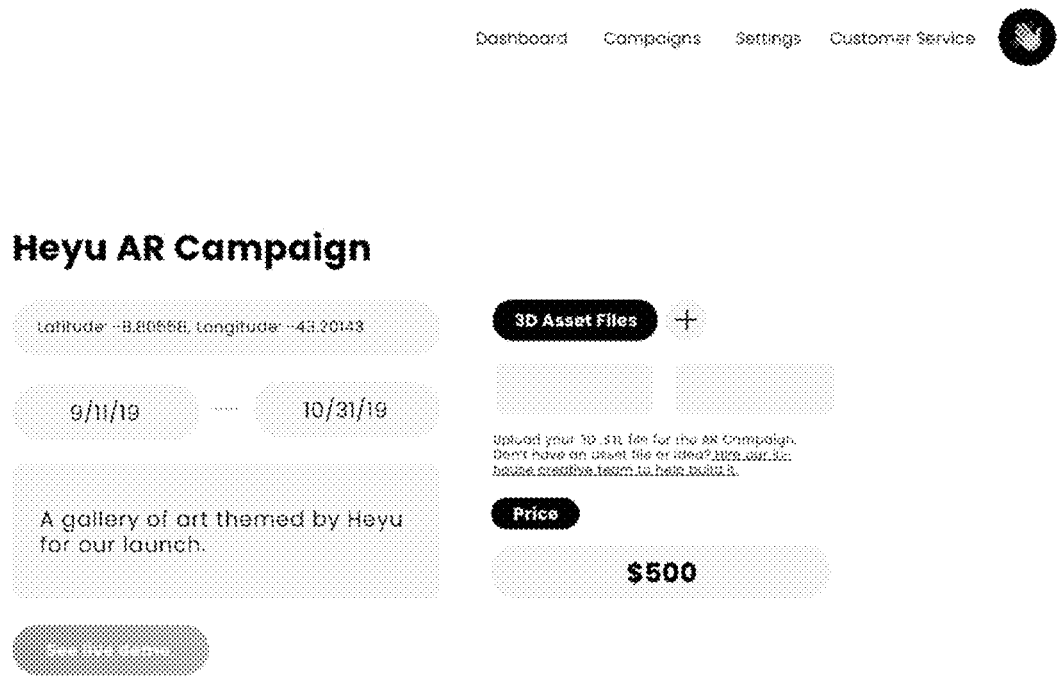
FIG. 12 illustrates one embodiment of an interface showing a dashboard for an advertising campaign on a social network.

FIG. 11 illustrates an embodiment of a dashboard for a business or other advertiser to view active advertising campaigns on the social network and information related to those campaigns. By creating or clicking on an existing campaign, the business can view details about that campaign. For example, FIG. 12 illustrates an interface that display information about the campaign including location (address or coordinates), run dates, cost, asset files and so forth.

Figure 13:
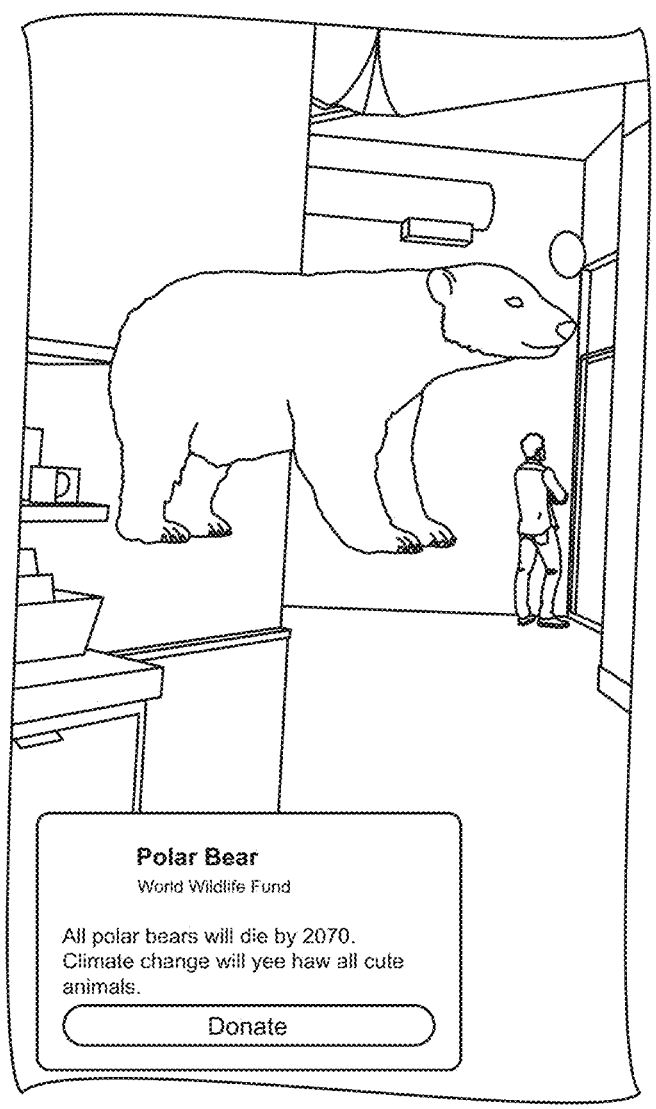
FIG. 13 illustrates one embodiment of an interface showing an overlaid element of an advertising campaign.

Because many campaigns may utilize elements that are overlaid at a specific location, it is preferred that coordinates are used so an advertiser can place the AR element in a preferred location. As an example, FIG. 13 illustrates a campaign for wildlife conservation that shows a polar bear overlaid in a building. Using the augmented reality overlay, users of the platform can view the polar bear as an element when viewing the area. If desired, users can click on the polar bear to obtain additional information and/or be presented with a hyperlink or automatically redirected to the information or area where further action could be taken.

As a few examples, clicking on an element could take the user to a page to donate to the charity sponsoring the element. In other contemplated embodiments, a user viewing a hamburger element could be taken to a page to order food, which may be delivered to the user's location (even as the user moves about an area). A user could also place an order for merchandise.

It is contempered that the elements could be interactive. In the case of the polar bear, it is contemplated that the element could vary over time, such as the polar bear walking around the area, yawning, eating and so forth. It is further contemplated that a user's interaction with the element could cause a change in the element. For example, if a user clicks the polar bear and donates, the element polar bear may be given food and begin eating, all in augmented reality.

Users can also take pictures of or with the elements, so that they are viewable in the pictures or videos taken. In the embodiments where the elements are interactive, it is contemplated that such interaction may be visible in the pictures or videos taken, such as a hamburger dripping on a user, or a polar bear standing on its hind legs.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for facilitating interaction of users using an interface, comprising:
   a server comprising a processor and a memory that stores information about a plurality of users;
   wherein the server is configured to receive information about a real world or virtual environment where a user is located, wherein the information comprises at least a location of the user in the real world or virtual environment;
   wherein the server is configured to (i) analyze the information to generate a first set of other users located within a predetermined distance of the location of the user, (ii) compare information about the first set of other users to information about the user to generate a second set of other users that is a subset of the first set, (iii) assign a match probability to each of the other users of the second set, and (iv) generate a third set of other users that is a subset of the second set, wherein each user of the third set has the match probability that exceeds a predefined threshold; and
   the server causing a set of elements to be generated and overlaid on a display of the user device, wherein each of the elements is associated with one of the users of the third set.

2. The system of claim 1, wherein each of the elements comprises information corresponding to one of the other users of the third set, and wherein each of the elements when actuated or selected causes a window to be overlaid on the display of the user device.

3. The system of claim 2, wherein the information comprises data gathered from a social media platform about one or more of the other users of the third set.

4. The system of claim 2, wherein the information comprises a picture and first name of the associated user with a border surrounding the element.

5. The system of claim 4, wherein a color of the border is based on the match probability of the user associated with the element.

6. The system of claim 1, wherein the display of the user device is configured to present a view of the real world or virtual environment where the user is located.

7. The system of claim 6, wherein the elements are overlaid on the view of the environment presented on the display of the user device, wherein each of the elements corresponds to a user shown in the view and one of the other users of the third set.

8. The system of claim 1, wherein each of the elements comprises a ring or other visible indicator, and wherein each of the rings or other visible indicators visually indicates the match probability associated with one of the other users of the third set.

9. The system of claim 8, wherein the visible indicator comprises a level of brightness of a border surrounding the element of that user.

10. The system of claim 8, wherein the visible indicator comprises a color of a border surrounding the element of that user.

11. The system of claim 1, wherein the server is further configured to cause the user device to produce a set of vibrations having a preset length and number of vibrations if the match probability of one of the other users in the third set is greater than the predefined threshold.

12. The system of claim 11, wherein the server is further configured to cause the user device to modify a number of vibrations or a length of each vibration of the set of vibrations based on a movement of the user toward the other user of the third set.

13. The system of claim 1, wherein the user device comprises a smart phone or a wearable device.

14. The system of claim 1, wherein the user device comprises glasses configured to present or display the elements to the user.

15. The system of claim 1, wherein the server is further configured to receive updated information about the real world or virtual environment where the user is located, wherein the updated information comprises an updated location of the user; and
   wherein the server is configured to (i) analyze the updated information to generate a fourth set of other users located with the predetermined distance of the updated location of the user, (ii) compare information about the fourth set of other users to information about the user to generate a fifth set of other users that is a subset of the fourth set, (iii) assign a match probability to each of the other users of the fifth set, and (iv) generate a sixth set of other users that is a subset of the fifth set, wherein each user of the sixth set has the match probability that exceeds the predefined threshold; and the server causing a second set of elements to be generated and overlaid on the display of the user device, wherein each of the elements is associated with one of the other users of the sixth set.

16. A system for facilitating interaction of users using an interface, comprising:

a server comprising a processor and a memory that stores information about a plurality of users;

wherein the server is configured to receive a location of a first user in a virtual environment;

wherein the server is configured to (i) analyze the location of the first user to generate a first set of users located within a predetermined distance of the user in the virtual environment, (ii) compare information about the first set of users to preferences of the first user to generate a second set of users that is a subset of the first set, (iii) assign a match probability to each of the users of the second set, and (iv) generate a third set of users that is a subset of the second set, wherein each user of the third set has the match probability that exceeds a predefined threshold; and the server causing a set of elements to be generated and overlaid on a display of the user device, wherein each of the elements is associated with one of the users of the third set.

17. A system for facilitating interaction of users using an interface, comprising:

a server comprising a processor and a memory that stores information about a plurality of users;

wherein the server is configured to receive a location of a plurality of users in a virtual environment;

wherein the server is configured to (i) determine a first set of users located within a predetermined distance of a first user in the virtual environment, (ii) compare information about the first set of users to preferences of the first user to generate a second set of users that is a subset of the first set, (iii) assign a match probability to each of the users of the second set, and (iv) generate a third set of users that is a subset of the second set, wherein each user of the third set has the match probability that exceeds a predefined threshold; and the server causing a set of elements to be presented in the virtual environment, wherein each of the elements is associated with one of the users of the third set.

* * * * *